United States Patent [19]

Davidson

[11] Patent Number: 4,788,617

[45] Date of Patent: Nov. 29, 1988

[54] LIQUID TRANSFER APPARATUS

[76] Inventor: Gordon K. Davidson, P.O. Box 7445 Stn D., Victoria, BC, Canada, V9B 5B8

[21] Appl. No.: 116,935

[22] Filed: Nov. 4, 1987

[51] Int. Cl.[4] .............................................. H02H 3/00

[52] U.S. Cl. .......................................... 361/1; 361/42; 427/8

[58] Field of Search ......................... 361/1, 42, 86, 88; 307/130; 427/8, 27

[56] References Cited

U.S. PATENT DOCUMENTS 3,934,055 1/1976 Tamny .................................... 427/8

4,546,400 10/1985 Holl ........................................ 361/1

*Primary Examiner*—Philip H. Leung

*Assistant Examiner*—Derek S. Jennings

*Attorney, Agent, or Firm*—Robert F. Delbridge; Arne I. Fors

[57] ABSTRACT

Apparatus for transferring an electrically conductive liquid from a first container to a second container in which the liquid is maintained at a substantially different electrical potential from the electrical potential of the liquid in the first container without causing significant change in the electrical potential of the liquid in the first container. The apparatus has a liquid transfer chamber with an electrically insulating inner surface, a sprinkler for sprinkling liquid from the first container into an upper portion of the liquid transfer chamber to cause liquid droplets to fall from the upper portion to a lower portion of the chamber, and a second container connected to the lower portion of the liquid transfer chamber to receive liquid therefrom. The liquid in the second container is maintained at a substantially different electrical potential from the electrical potential of liquid in the first container, any flow of electric current from liquid in the second container to liquid in the first container is detected, and adjustable appropriate electrical potential is applied to liquid droplets from the sprinkler to reduce the current flow substantially to zero.

10 Claims, 2 Drawing Sheets

LIQUID TRANSFER APPARATUS

This invention relates to apparatus for transferring electrically-conductive liquid from a first container to a second container in which the liquid is maintained at a substantially different electrical potential from the electrical potential of the liquid in the first container without causing significant change in the electrical potential of liquid in the first container.

Such apparatus is used, for example, in connection with the electrostatic spraying of electrically-charged liquids. The liquid may be one used in agriculture, such as a herbicide or an insecticide, or may be paint. In such cases, it is necessary to charge the liquid in the second container, which is usually part of the spraying equipment, to a relatively high electrical potential before it is sprayed, while at the same time preventing any significant change in the electrical potential of the liquid in the first container, which may be a storage container for the liquid. For safety reasons, it is usually necessary that the first container be maintained substantially at ground potential. It is therefore, important that the first container does not become charged by flow of electric current from the second container to the first container. If the first container is simply grounded, the charge in the liquid would drain off to ground instead of going off in the spray from the nozzles.

Because the liquid is electrically conductive, it is difficult to prevent flow of electric current from the second container back through the liquid to the first container. Attempts have been made to transfer liquid from the first container to the second container by creating a stream of droplets but prior attempts of this kind have not significantly overcome the problem. One example of such prior art is disclosed in U.S. Pat. No. 3,934,055 (Tamny) issued Jan. 20, 1976.

It is, therefore, an object of the invention to provide improved apparatus of this kind which minimizes the likelihood of unwanted charging of liquid in the first container by current flow from liquid in the second container.

According to the present invention, liquid transfer apparatus comprises means forming a liquid transfer chamber with an electrically-insulating inner surface, means for sprinkling liquid from the first container into an upper portion of the liquid transfer chamber to cause liquid droplets to fall from the upper portion to a lower portion of the chamber, a second container connected to the lower portion of the chamber, a second container connected to the lower portion of the liquid transfer chamber to receive liquid therefrom, means for maintaining liquid in the second container at a substantially different electrical potential from the electrical potential of liquid in the first container, means for detecting flow of electric current from liquid in the second container to liquid in the first container, and adjustable means for applying appropriate electrical potential to liquid droplets from said sprinkling means to reduce said current flow substantially to zero.

In addition to minimizing the likelihood of unwanted charging of liquid in the first container by current flow from liquid in the second container, a further advantage of the present invention is that it enables the liquid in the second container to be charged by conduction charging instead of by induction charging, a feature which is of significant benefit in achieving higher voltages in the spray than is possible with induction charging.

The liquid sprinkling means may comprise a droplet forming sprinkler head in the upper portion of the chamber, with the means for applying electrical potential comprising an induction ring surrounding the sprinkler head in spaced relationship thereto.

The lower portion of the chamber may converge to a bottom opening leading to the second container, with the converging lower portion having a metal inner surface maintained at the same potential as the liquid in the second container. A metal screen may extend across the top of the metal inner surface of the converging lower portion.

The apparatus may also include means for controlling liquid in the second container at a level to avoid formation of a pool of liquid in the lower portion of the chamber.

The detecting means may comprise an electrical probe associated with the liquid sprinkling means and in electrical communication with the liquid.

The apparatus may also include means for supplying air under pressure to the chamber to pressurize liquid in the second container and in the remainder of the system.

As previously indicated, the means for maintaining liquid in the second container at the said potential may comprise a high-voltage generator in electrical conducting communication with the liquid.

The apparatus may also include a shroud of electrically-insulating material surrounding the sprinkler head and the induction ring to reduce likelihood of droplets wetting an upper surface of the changer.

Embodiment of the invention will now be described, by way of example, with reference to the accompanying drawings, of which:

Figure 1:
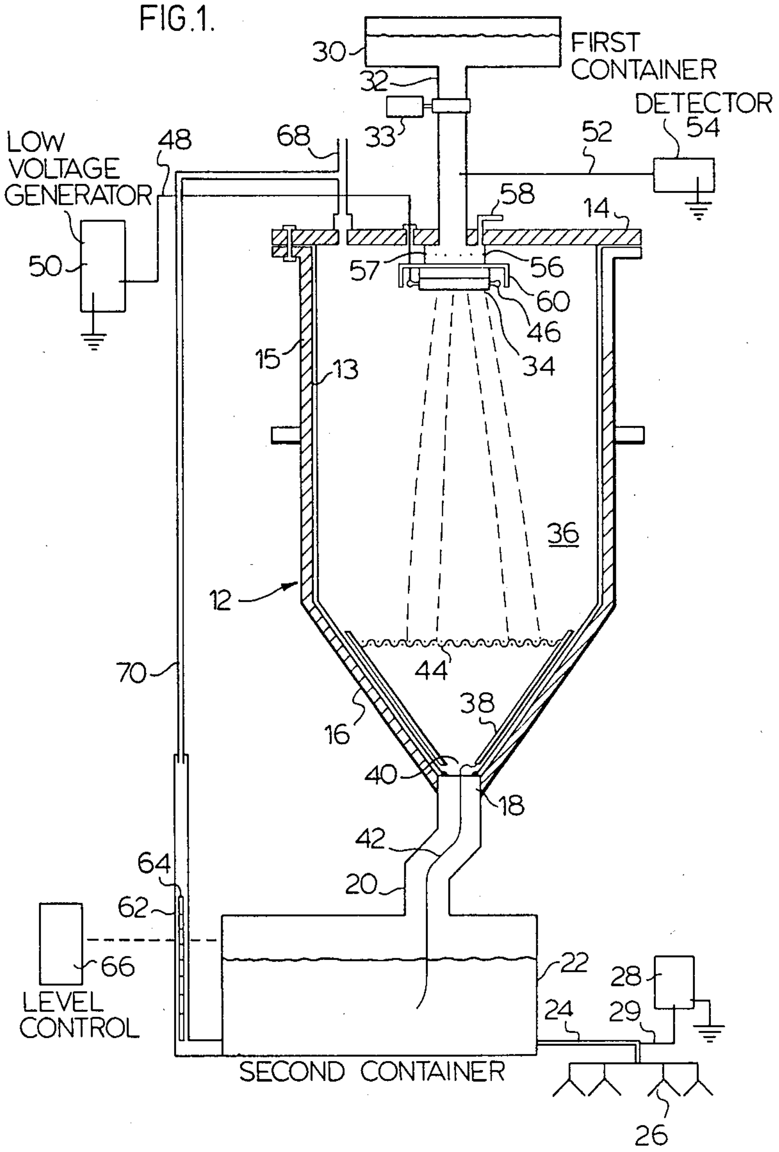
FIG. 1 is a diagrammatic side view of apparatus in accordance with one embodiment of the invention in which the electrical potential of the liquid droplets sprinkled into the liquid transfer chamber is manually controlled.
Figure 2:
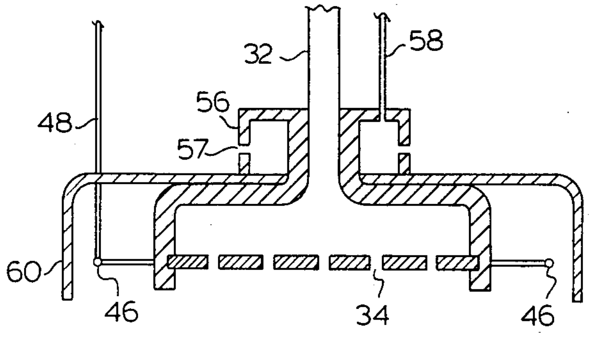
FIG. 2 is an enlarged view of the sprinkler head and surround structure.

Referring first to FIG. 1 and 2, liquid transfer apparatus for crop-spraying equipment comprises a liquid transfer tank 12 with a removable cover 14 which is normally secured to the tank 12 by bolts (not shown). The tank 12 is constructed with an electrically insulating liner 13 (such as polypropylene sheet with a non-wetting surface). The liner 13 is reinforced by an outer casing 15 of fiberglass so that it will withstand an internal pressure of up to about 30 psi (200 kPa). The dimensions of the tank 12 depend on the required flow rate and working voltages. In the present embodiment, the tank 12 is of circular section with a diameter of 11.0 inches (28 cms.) and a height of 21 inches (53 cms.).

The tank 12 has a lower portion 16 of inverted conical shape with an outlet 18 at the lower end, the outlet 18 being connected by a pipe 20 of electrical insulating material to the top of a reservoir 22 of suitable non-metallic material. Liquid is supplied from the bottom of the reservoir 22 through a plastic insulating pipe 24 to spray nozzles 26. A high-voltage generator 28 is connected to pipe 24 by an electrical line 29 so as to effect conduction charging of liquid fed from the reservoir 22 to the spray nozzles 26. Generator 28 is appropriately grounded and, may for example, charge the liquid to 55 kV. The generator 28 may be adjustably remotely controlled so that the liquid may be charged to any selected voltage up to 60 kV.

Liquid is supplied to the liquid transfer tank 12 from a storage tank 30 through a feed pipe 32 by a pump 33. The feed pipe 32 is of a length sufficient to enable the detector to operate, as will be described in more detail later. The feed pipe 32 passes through the tank cover 14 and feeds the liquid to a droplet forming sprinkler head 34 in the upper portion of the tank 12, so that liquid droplets leaving the sprinkler head 34 fall downwardly through the chamber 36 formed by the tank 12.

The conical lower portion 16 of the tank 12 contains a metal lining 38 also of inverted conical shape, the metal lining 38 having a lower end opening 40 communicating with the lower end outlet 18 of the tank 12. The upper edge of the conical lining 38 is covered by an insulating plastic cover (not shown). A conducting wire 42 extends from the metal lining 38 through the plastic pipe 20 into the reservoir 22 and into the liquid therein so that the metal lining 38 is maintained at the same electrical potential as the liquid in the reservoir 22. A metal screen 44 extends across the upper wider end of the metal lining 38 and is in electrical contact therewith, the screen 44 in this embodiment comprising a peripheral copper tube laced with fine wire forming an open mesh.

At the upper end of chamber 36, an induction ring 46 of insulated wire surrounds the sprinkler head 34 in closely spaced relationship therewith and is connected by an insulated wire 48 to a relatively low voltage generator 50. The generator 50, which is also appropriately grounded may for example, be capable of producing voltage in the range of from about 5 to about 10 kV, the voltage being of opposite polarity to the voltage produced by the high voltage generator 28. An electrical probe wire 52 extends from the interior of liquid feed pipe 32 to a grounded detector 54 to detect current flow from liquid in the feed pipe 32 to ground, i.e. to detect current flow from the liquid in the second container 22 to liquid in the first container 30.

A sluice collar 56 with circumferential apertures 57 surrounds the supply pipe 32 within the tank 12 above the sprinkler head 34, and can be supplied with liquid through an inlet pipe 58 for a purpose which will be described later. An electrically non-conducting plastic shroud 60 covers the top of and surrounds the sides of sprinkler head 34 and induction ring 46.

The reservoir 22 has an external transparent vertical pipe 62 communicating with the bottom of reservoir 22 and containing an opaque float 64. The float 64 interrupts or does not interrupt light from a light source (not shown) to a photoelectric unit 66 which controls inlet pump 33 to control the supply of liqid in such a manner that the liquid level in the reservoir 22 is maintained at a desired level.

The spray system is pressurized by air supplied under pressure to the chamber 36 through an air-supply pipe 68 passing through the tank cover 14, with air-supply pipe 68 also being connected by tube 70 to the upper end of level indicator pipe 62 for pressure equalization purposes. The air pressure pressurizes liquid in the reservoir 22 to force the liquid out of the spray nozzls 26 when the apparatus is in use. Once the chamber 36 has been pressurized, no further air is used except to make up pressure caused by any minor leakage, since liquid in reservoir 22 is always maintained at a desired level as previously described.

In use of the apparatus, liquid is caused to be supplied from holding tank 30 through the supply pipe 32 so as to be forced through the droplet forming sprinkler head 34 into the upper portion of chamber 36. The liquid droplets fall downwardly through the chamber 36 and pass through wire screen 44 into the metal lining 38 in the lower portion of the chamber 36 and then through outlets 18, 40 into electrically-insulating pipe 20 and into reservoir 22. The diameter of pipe 20 is selected, in conjunction with liquid flow rate, such that liquid flow never occupies the whole of the cross section area of pipe 20 to avoid the possibility of air locks occurring between liquid in pipe 20 and reservoir 22. Also, in the present embodiment, the pipe 20 slopes downwardly at an angle of about 45 degrees to the vertical over a portion of its length to minimize splashing from the reservoir 22 back into the chamber 36.

Figure 3:
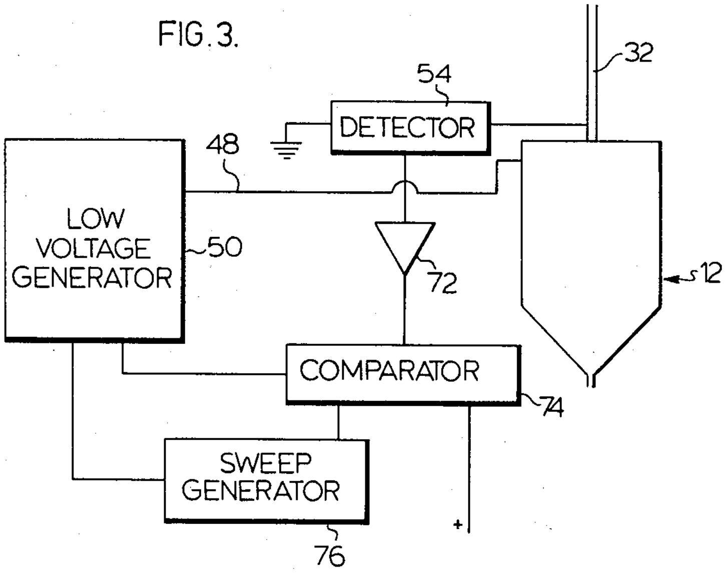
FIG. 3 is a view in block diagram form of an electrical circuit in accordance with a second embodiment of the invention in which the electrical potential of the liquid droplets sprinkled into the liquid transfer chamber is automatically controlled.

In accordance with the invention, the voltage supplied by the voltage generator 50 to the induction ring 46 surrounding the sprinkler head 34 is adjusted until substantially no current flow through the probe 52 and detector 54 to ground. This may be done manually by providing the detector 54 with an appropriate read-out which is then read so that the voltage supplied by generator 50 can be manually adjusted until the read-out indicates a substantially zero current. Induction ring voltage adjustment may alternatively be carried out automatically, for example, by an arrangement such as that shown in FIG. 3. In this case, the detector 54 produces a signal indicative of current flow, and this signal is amplified by amplifier 72, with the amplified signal being sent to comparator 74. The comparator 74 is adjusted so that receipt of an amplified signal of current flow causes the comparator 74 to send an output signal to actuate sweep generator 76 which adjusts the voltage of high-voltage generator 50 until a state of no current flow is detected by detector 54.

Since a failure in the system, such as clogging of the spray nozzles 26, may cause backup of liquid into the chamber 36 which will result in increase of current flow as detected by detector 54 rising to an unacceptable value, provision should be made so that the system is automatically shut down if such an occurrence is detected.

When it is desired to effect cleaning of the interior of the tank 12, for example, when changing from one liquid to another, water can be passed through supply pipe 58 into the sluice head 56 from which it is expelled through peripheral apertures 57 to cause the interior wall of the tank 12 to be washed. The liquid to be sprayed can alternatively be supplied to sluice head 56 if it becomes necessary to break up any electrical conduction tracks which may have been formed by liquid on the interior walls of the tank 12. After such treatment, the polypropylene lining 13 will cause the remaining droplets of liqid thereon to be separate and, hence, electrically insulated from one another. However, and owing to other features of the invention, operation of the sluice head 56 for this reason will seldom be required, usually only after an automatic shutdown has been initiated by the current detector system.

The apparatus in accordance with the invention deals with problems caused by charging the liquid in the second container 22 to high voltage. It is known that the use of such high voltage in electrostatic liquid spraying has substantial advantages, for example, reduction in liquid consumption compared to when such voltages are not utilized. The use of the electrically-insulating lining for the tank 12 reduces the likelihood of charging of the upper end of the tank 12 by conduction from the lower end. As mentioned earlier, any conduction tracks formed by liquid on the interior wall of tank 12 can be broken up by use of the sluice head 56. The electrically-insulating material 13 lining the tank 12 must also be of such a nature that the high voltage used to charge the liquid in the second container 22 does not cause break-down of the electrical insulating properties of the material. It is also desirable that the lining has a non-wetting surface so that liquid droplets on it tend to remain apart and not run together for form conducting tracks.

The conical metal lining 38 of the bottom of chamber 36 is charged in the same manner as the liquid in the reservoir container 22 because of its connection thereto by wire 42. Such charging of the metal lining 38 assists in providing steady electrostatic conditions in the chamber 36 which would not otherwise exist because of the intermittent nature of the formation of liquid droplets in the chamber 36. The wire screen 44 minimizes the possibility of droplets being recharged by hitting the metal lining 38 and thereby being caused to return to the upper part of chamber 36 instead of running downwardly as desired into the reservoir 22. As previously mentioned, liquid flow is controlled so that the metal lining 38 never contains a pool of liquid which, if present, may cause splashing when hit by falling droplets.

The principal use of induction ring 46 is to counter the induction of charges in the droplets of the sprinkler head 34 by the metal lining 38 in the bottom of the chamber 36. As a result, the droplets traversing the chamber 36 are not charged, at least on a statistical basis, and therefore do not fly around and wet the interior walls so as to create damaging conduction tracks. In order to keep the current induced by the metal lining 38 within controllable limits, there should be air gap of suitable length between the head 34 and lining 38. This suitable length, also prevents the onset of avalanche ionisation currents within the chamber 36. Such currents start from exposed metal surfaces. For this reason, the upper edge of the lining 38 and the induction ring 46 are both insulated with insulating plastic.

The insulating shroud 60 surrounding the sprinkler head 34 and induction ring 46 prevents random escapes of droplets from the sprinkler head 38 striking the top 14 of the chamber 36 where they could form conducting tracks.

Other embodiments and advantages of the invention will be readily apparent to a person skilled in the art from the foregoing description, the scope of the invention being defined in the appended claims.

I claim:

1. Apparatus for transferring an electrically conductive liquid from a first container to a second container in which the liquid is maintained at a substantially different electrical potential from the electrical potential of the liquid in the first container without causing significant change in the electrical potential of the liquid in the first container, said aparatus comprising:

means forming a liquid transfer chamber with an electrically insulating inner surface, means for sprinkling liquid from the first container into an upper portion of the liquid transfer chamber to cause liquid droplets to fall from the upper portion to a lower portion of the chamber, a second container connected to the lower portion of the liquid transfer chamber to receive liquid therefrom, means for maintaining liquid in the second container at a substantially different electrical potential from the electrical potential of liquid in the first container, means for detecting flow of electric current from liquid in the second container to liquid in the first container, and adjustable means for applying appropriate electrical potential to liquid droplets from said sprinkling means to reduce said current flow substantially to zero.

2. Apparatus according to claim 1 wherein said liquid sprinkling means comprises a droplet forming sprinkler head in the upper portion of the chamber, and said means for applying electrical potential comprises an induction ring surrounding the sprinkler head in spaced relationship thereto.

3. Apparatus according to claim 1 wherein the lower portion of the chamber coverges to a bottom opening leading to the second container, and said converging lower portion has a metal inner surface maintained at the same potential as the liquid in the second container.

4. Apparatus according to claim 3 including a metal screen extending across an upper portion of the metal inner surface of the converging lower portion.

5. Apparatus according to claim 3 including means for controlling the liquid level in the second container to maintain a desired level.

6. Apparatus according to claim 1 wherein the detecting means comprises an electrical probe associated with said liquid sprinkling means and in electrical communication with the liquid.

7. Apparatus according to claim 1 including means for supplying air under pressure to the chamber to pressurize liquid in the second container.

8. Apparatus according to claim 1 wherein said means for maintaining liquid in the second container at said potential comprises a high voltage generator in electrical conduction communication with said liquid.

9. Apparatus according to claim 2 comprising a shroud of electrically-insulating material surrounding the sprinkler head and the induction ring to reduce likelihood of droplets wetting an upper surface of the chamber.

10. Apparatus according to claim 1 including means for supplying liquid into an upper portion of the chamber to flush the inner surface thereof.

* * * * *